(12) United States Patent
Takeuchi

(10) Patent No.: US 6,302,544 B1
(45) Date of Patent: Oct. 16, 2001

(54) IMAGE PROJECTION SYSTEM WITH LIGHT REFLECTOR

(75) Inventor: Tadashi Takeuchi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 09/522,822

(22) Filed: Mar. 10, 2000

(30) Foreign Application Priority Data

Dec. 3, 1999 (JP) .................................................. 11-067557

(51) Int. Cl.[7] .................................................. G03B 21/28
(52) U.S. Cl. .................................. 353/98; 349/67; 353/20
(58) Field of Search .............................. 353/98, 99, 102, 353/31, 34, 37, 38; 349/5, 8, 9, 67

(56) References Cited

U.S. PATENT DOCUMENTS

| | | | |
|---|---|---|---|
| 5,123,729 | * 6/1992 | Kondo et al. | 353/99 |
| 5,142,387 | * 8/1992 | Shikama et al. | 353/122 |
| 5,192,962 | * 3/1993 | Nishida et al. | 353/98 |
| 5,911,489 | * 6/1999 | Watanabe | 353/98 |
| 6,154,320 | * 11/2000 | Itoh et al. | 353/97 |

FOREIGN PATENT DOCUMENTS 8-262437    10/1996   (JP) .

\* cited by examiner

*Primary Examiner*—William Dowling
(74) *Attorney, Agent, or Firm*—McGuireWoods LLP

(57) ABSTRACT

In an image projection system, light emitted by a point source is reflected off the concave surface of a reflector to a fly-eye-lens system where the incident light is distributed to uniformly irradiate multiple optical elements. Each optical element splits incident light into a first polarized component and a second orthogonally polarized component parallel to the first component and converting the second component to polarization identical to the first component. Light from the enhancer is imagewise-modulated by an image formed in a display panel and projected onto a screen. The reflector is configured so that any point on the reflector is defined by an equation containing a term of parabola and at least one term of a series of aspheric coefficients of order of even number which is equal to or greater than two.

3 Claims, 5 Drawing Sheets

IMAGE PROJECTION SYSTEM WITH LIGHT REFLECTOR

BACKGROUND OF THE INVENTION

1. Field of the Invention

The present invention relates generally to the projection of images on a screen and more specifically to an optical reflector capable of achieving high utilization efficiency.

2. Description of the Related Art

A prior art image projector has a point-source lamp 100 located at the focal point of a parabolic reflector 101 as shown in FIG. 1A or at one of the two focal points of a spheroidal reflector 102 as shown in FIG. 1B. Rays from a point source 100 are reflected off in different ways as illustrated depending on the concave shape of the reflector. In the case of parabolic reflector 101, reflected rays run parallel along the optical axis of the reflector, whereas the rays reflected off the spheroidal reflector 102 converge to the other focal point of the reflector 102. Depending on the specific needs of projection systems, one of these reflectors is employed.

The reflected light is modulated imagewise by passing it through a liquid crystal display (LCD) panel on which a video image is produced and the modulated light is projected onto a screen. To irradiate the LCD panel with uniform light intensities, a fly-eye-lens system (known as an integrator) is used to uniformly distribute the flux densities. In addition, since the liquid crystal panel utilizes light of only one polarization component, it is the usual practice to employ a light enhancer to increase the amount of useful light. This enhancer is composed of an array of light shields where rays from the fly-eye-lens system are masked and the unmasked potions are allowed to enter an array of beam splitters where they are split into first and second polarization components, the first being the useful component and the second being the otherwise useless component. The light enhancer is further provided with an array of reflectors and associated phase shifters. On each of the reflectors the second component of light from the corresponding beam splitter is reflected off to the associated phase shifter, where it is rotated and aligned to the polarization plane of the first component and emitted in parallel therewith.

However, aberrations of light occur on the surface of the light enhancer due to finite dimensions of the point-source lamp. Such aberrations are particularly severe if the projector uses a light reflector of the spheroidal type due to its unparallel light rays to which the light enhancer is exposed. More specifically, the fly-eye-lens system is composed of two parallel plates, each having a matrix array of cells, or microscopic lenses. They are spaced at such a distance apart so that rays leaving one cell of the first plate are focused onto a corresponding cell of the second plate. Because of the unparallel paths of light from the spheroidal reflector, rays incident on the first fly eye lens plate are caused to progressively increase their aberration as they pass through the fly-eye-lens system. Further, due to the aberrations caused by the finite dimensions of the point-source light, rays incident on each cell of the second fly eye lens plate are formed into an elliptical shape, and the size of such shapes on the outer areas of the second fly-eye-lens plate is greater than the size of those in the inner areas. Therefore, uniformity of densities is lost, known as "flares", at the entry surface of the light enhancer, and hence a large amount of luminous flux is shielded off by the light enhancer, resulting in a substantial loss of useful light for imagewise modulation.

On the other hand, the rays from the light reflector of paraboroidal type are less severe in aberration at the entry surface of the light enhancer than the rays from the spheroidal reflector, and hence higher light utilization efficiency is possible. However, if the aperture of the parabolic reflector is limited, it is impossible to increase its dimensions along the optical axis to increase the amount of light for projection. Thus, the parabolic reflector has a lower reflectivity than the spherical reflector. One approach is to employ a part-spherical auxiliary reflector at the aperture of a parabolic main reflector for reflecting portions of outwardly emitted light back to the interior of the main reflector, as disclosed in Japanese Laid-Open Patent Specification 8-262437. However, the reflector and hence the projection system as a whole becomes undesirably bulky.

Although the longitudinal dimensions of the parabolic reflector can be increased for a given size of aperture if the reflector may be designed with a short focal point, there is interference between the point-source lamp and the interior surface of the reflector on the one hand, and there is, on the other, an increase in the amount of rays lost by the through-hole provided in the reflector for the electrodes of the light source.

SUMMARY OF THE INVENTION

It is therefore an object of the present invention to provide an image projection system in which high utilization efficiency of available optical energy is provided.

According to the present invention, the image projection system comprising a reflector for reflecting rays of light from a point source located at the focal point of the reflector, a matrix array of microscopic lenses arranged on a first plane and a matrix array of microscopic lenses arranged on a second plane, each lens of the first plane focusing light from the reflector onto a corresponding one of the lenses of the second plane, a plurality of optical elements arranged on a third plane for splitting light from the second plane into a first polarized component and a second orthogonally polarized component parallel to the first component and converting the second component to polarization identical to the first component, a focusing lens system for focusing light from the third plane onto a fourth plane, a display panel on the fourth plane for imagewise-modulating light focused thereon by the lens system, and a projecting lens system for projecting the imagewise-modulated light onto a screen. The reflector is configured so that any point on the reflector is defined by an equation containing a term of parabola and at least one term of a series of aspheric coefficients of order of even number which is equal to or greater than two.

BRIEF DESCRIPTION OF THE DRAWINGS

The present invention will be described in further detail with reference to the accompanying drawings, in which.

DETAILED DESCRIPTION

Figure 1A:
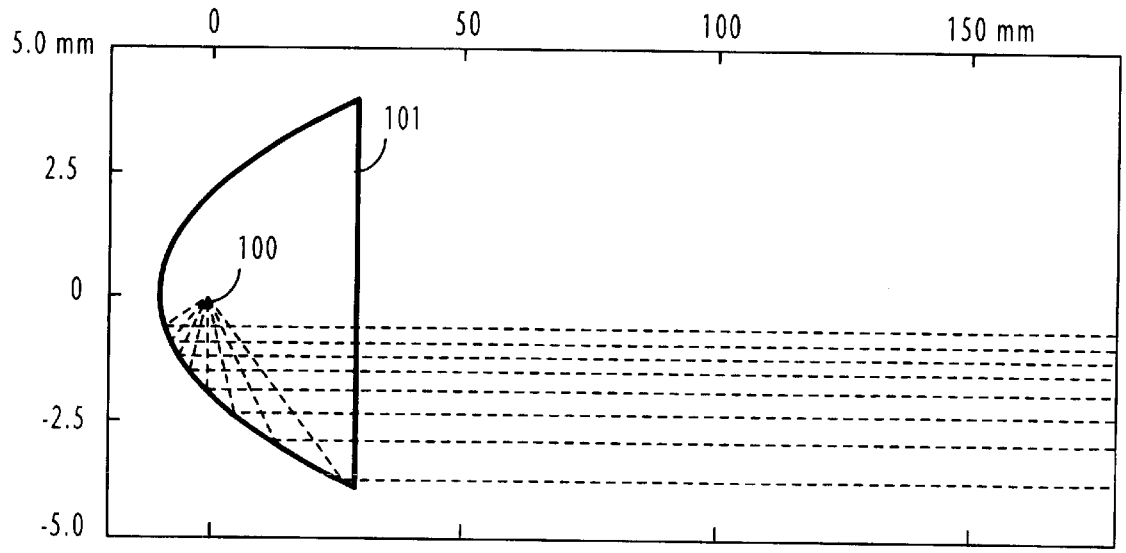
FIG. 1A is a cross-sectional view of a prior art paraboroidal reflector.
Figure 1B:
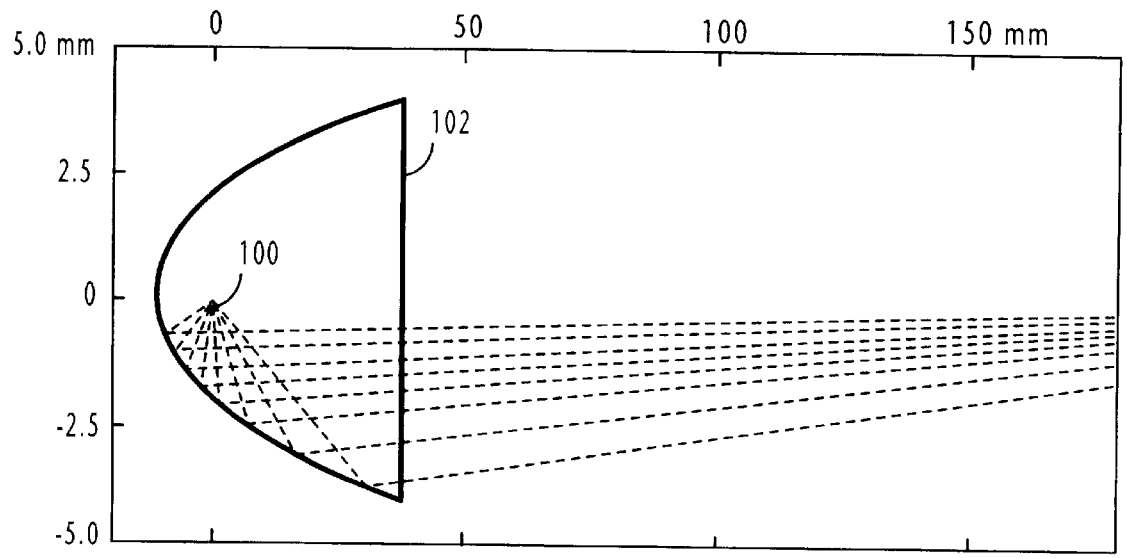
FIG. 1B is a cross-sectional view of a prior art spheroidal reflector.
Figure 2:
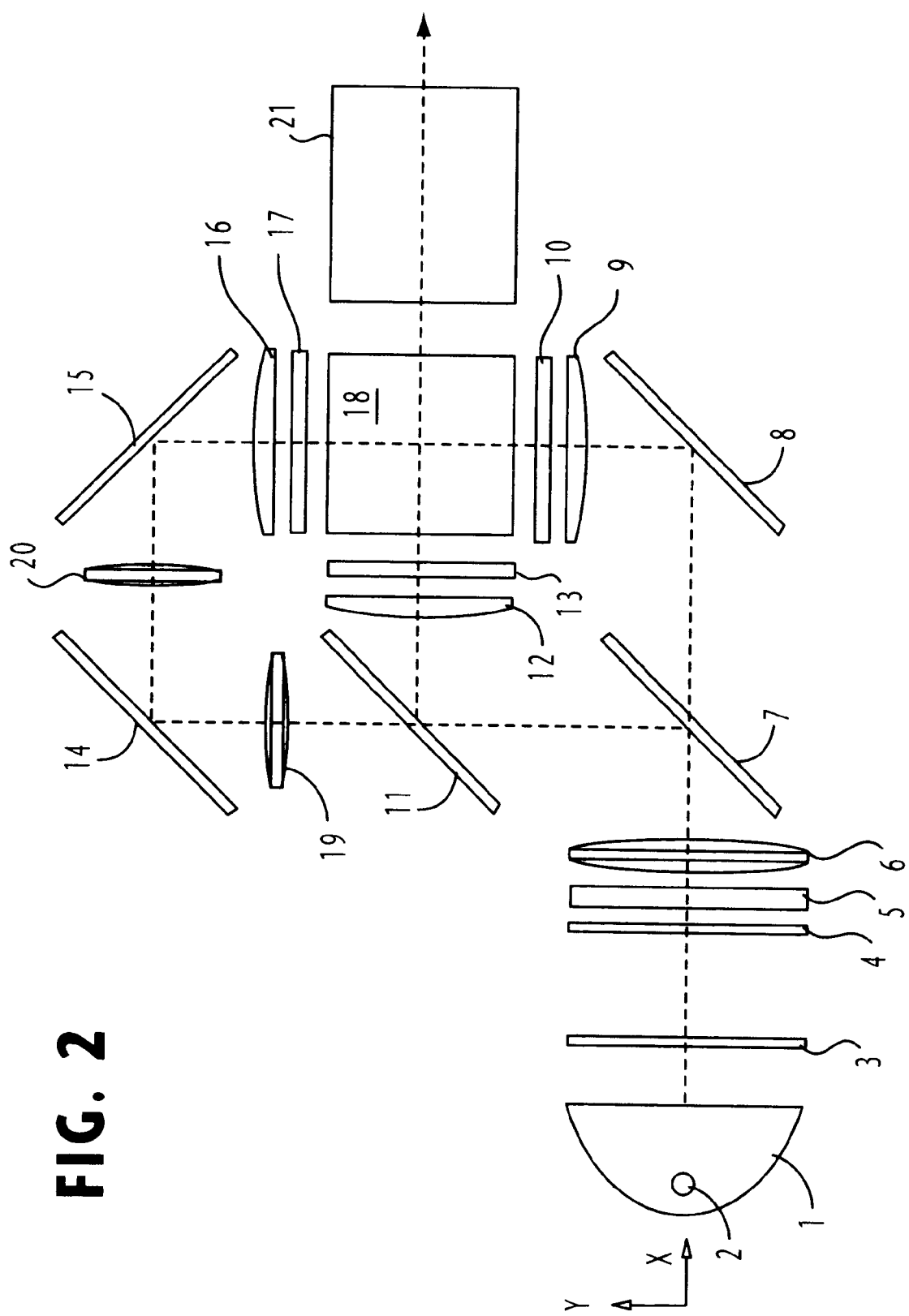
FIG. 2 is a schematic view of an image projection system embodying the present invention.

In FIG. 2, there is shown an image projection system embodying the present invention. The system includes a light reflector 1 and a point-source lamp 2 located at the focal point of the light reflector 1. Along the optical axis of the light reflector 1 are arranged a fly-eye-lens system comprising a pair of first and second plates 3 and 4, an optical enhancer 5, and a condenser lens 6.

Figure 3:
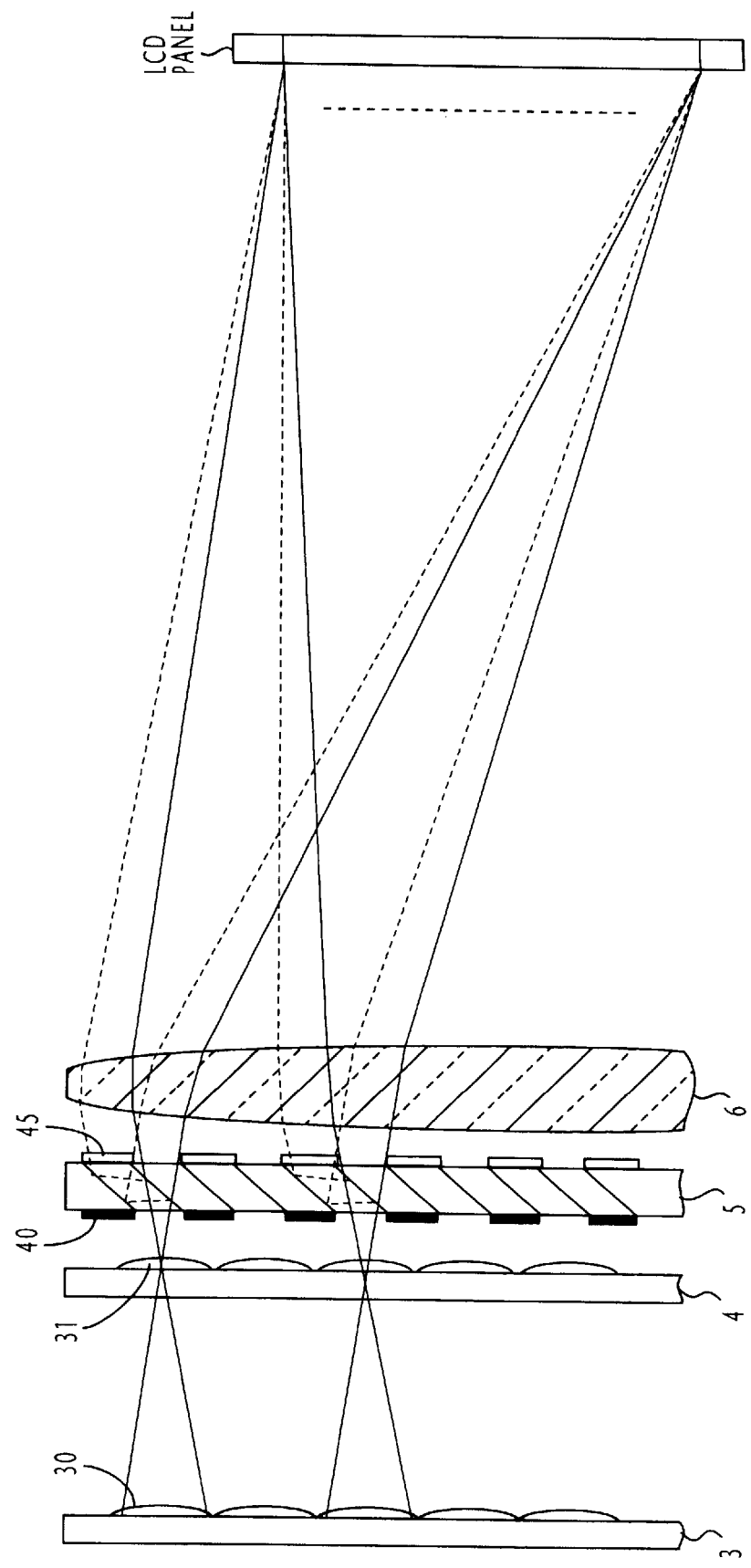
FIG. 3 is a cross-sectional view of a portion of the projection system showing details of the fly-eye-lens system and light enhancer.

Each of the fly-eye-lens plates 3 and 4 has a matrix array of cells of microscopic lenses with the center of the array being aligned with the optical axis of the light reflector 1. In order to uniformly distribute flux densities of light from the light reflector 1, the first and second plates 3 and 4 are spaced at such a distance apart so that rays leaving each cell 30 of the first plate 3 are focused to a corresponding cell 31 of the second plate 4 as shown in detail in FIG. 3. Optical enhancer 5 is located behind the second fly-eye-lens plate 4 to be uniformly illuminated by incident light.

Figure 4:
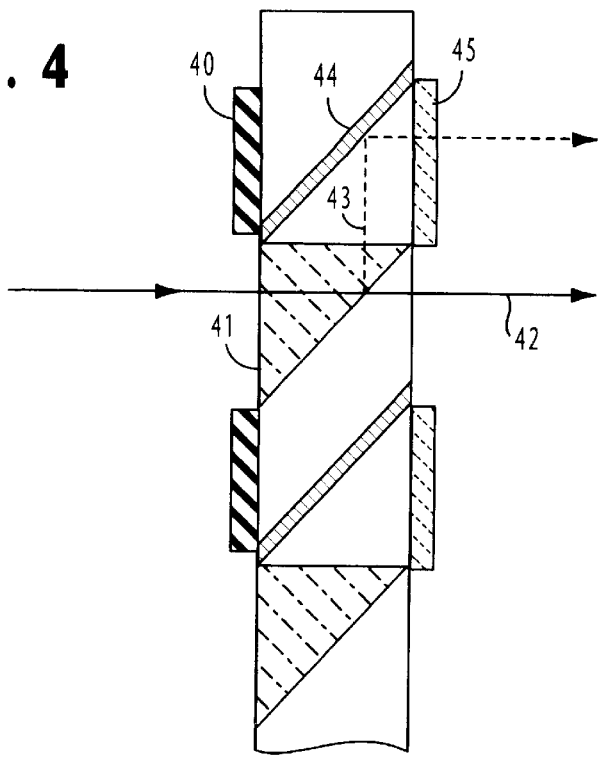
FIG. 4 is a cross-sectional view of a portion of the light enhancer.

As shown in detail in FIG. 4, the light enhancer 5 is composed of an array of horizontal light shields 40 where rays from the second flyeye-lens plate 4 are masked and the unmasked portions of the light are allowed to enter an array of polarization beam splitters 41 where they are split into a first component 42 and a second component 43, the first component 42 being the useful component and the second component 43 being the otherwise useless component. Light enhancer 5 is further provided with an array of reflectors 44 and associated phase shifters 45. The second component 43 of light from the corresponding beam splitter 41 is reflected off the reflector 44 to the associated phase shifter 45 which causes the polarization plane of the incident light to be aligned to that of the first component 42 and both components are emitted in parallel. Light emitted from the light enhancer 5 is focused by the condenser lens 6 onto a liquid crystal display panel (see FIG. 3).

A dichroic mirror 7 is located behind the condenser lens 6 to split the incident light into a first primary color component and the other two color components. The first primary color component is directed to a mirror 8 where it is reflected off to a first LCD panel 10 via a condenser lens 9. The other primary color components are reflected off the dichroic mirror 7 to a second dichroic mirror 11, where they are split so that the second primary color component is directed to a second LCD panel 13 via a condenser lens 12. The third primary color component passes through the dichroic mirror 11 and its optical path is deflected by mirrors 14 and 15 to a third LCD panel 17 via a condenser lens 16. The primary color components incident on each of the LCD panels 10, 13 and 17 are imagewise-modulated by respective video images and combined into a single color image by a dichroic prism 18 and projected by a projection lens system 21 onto a screen, not shown, located at a distance which is conjugate with respect to each of the LCD panels. Condenser lens 6 is used to form a sharp focus on each of the LCD panels. Release lenses 19 and 20 are provided for adjusting the focal point of the third primary component on the LCD panel 17.

According to the present invention, the light reflector 1 has a concave surface and any point on the concave surface is defined by the following equation:

$$x = \frac{1}{R}y^2 \div \left(1 + \sqrt{1-(K+1)y^2\frac{1}{R^2}}\right) + \sum_{i=1}^{i=N} A_{2i}y^{2i} \quad (1)$$

where, x is a distance from the vertex of the parabolic reflector along its optical axis, y is a distance from the optical axis on a plane normal to the optical axis x, R is the radius of curvature, K is an aspheric constant, $A_{2i}$ is an aspheric coefficient of order 2i, and i and N are an integer equal to or greater than 1 (for further information see Japanese-laguage publications titled "Introduction to Optics", Toshio Kishikawa, Oputoronikus-sha, and "Guides to the Design of Lenses", Eiichi Takano, Shashin Kougaku Shuppan). Note that the aspheric constant K is smaller than −1 for hyperbolic surfaces, equal to −1 for parabolic surfaces, larger than −1 and smaller than 0 for elliptical surfaces, and equal to 0 for spherical surfaces.

Figure 5:
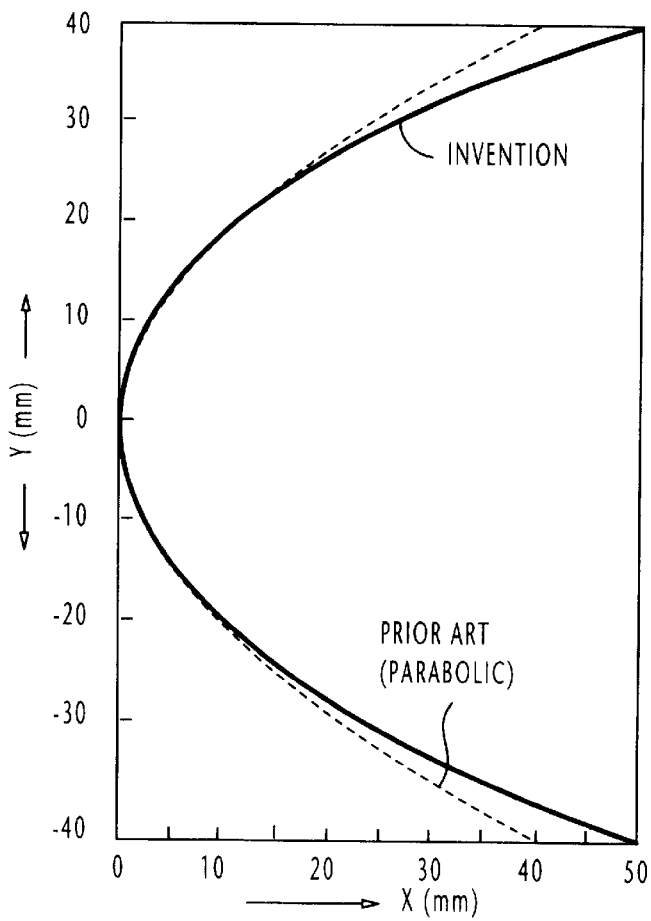
FIG. 5 is a cross-sectional view of the light reflector of the present invention in comparison with the prior art palaboroidal reflector.

In the case of a normal parabolic surface, the curvature K is equal to −1 and the high-order aspheric coefficients $A_{2i}$ are all zero, giving the relation $x=(\frac{1}{2}R)y^2$. Whereas, in the present invention, K=−1, $A_4=1.5\times10^{-6}$, $A_6=1.5\times10^{-9}$, $A_8=1.5\times10^{-16}$, and $A_{10}=4.0\times10^{-18}$. As a result, the light reflector 1 has a lower rate of increase in section toward its aperture as indicated by a thick-line curve of FIG. 5 than the rate of similar increase in the case of a pure parabolic reflector indicated by the dotted-line curve. In other words, the light reflector 1 takes the shape of a paraboloid of revolution (with K=−1) and a spheroid of revolution. he length of the reflector 1 along its optical axis is thus greater than that of a paraboloidal reflector. Therefore, a larger amount of luminous flux can be exploited from the optical energy emitted from the point source 2 for imagewise-modulation than is possible with parabolic reflectors.

Figure 6:
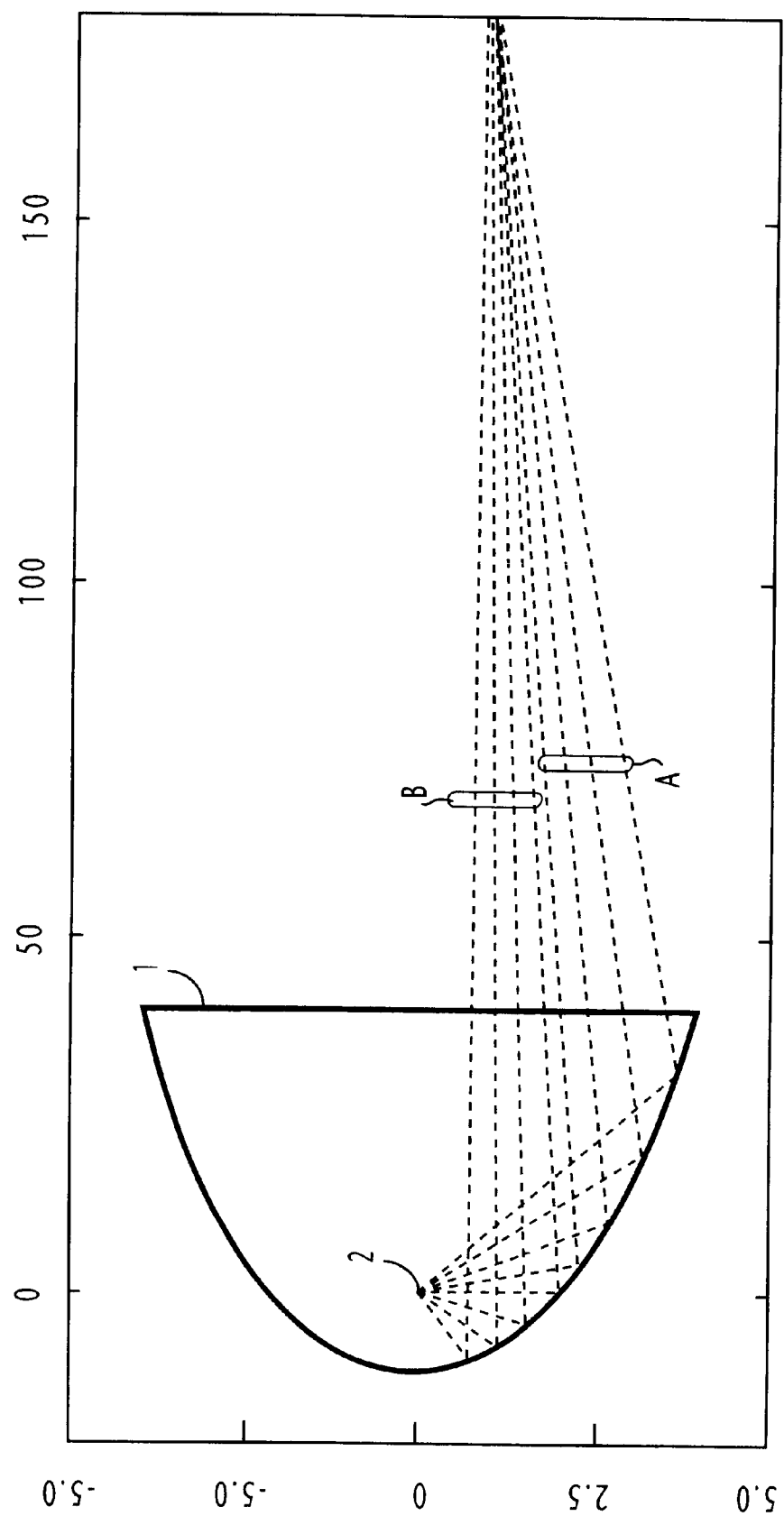
FIG. 6 is a cross-sectional view of the light reflector of the present invention showing reflected beams of light.

As shown in FIG. 6, the reflector 1 produces a near-parallel beam of light in the outer portion of the reflector near its edge as indicated by a bundle of rays A and a parallel beam of light in the inner portion of the reflector near its optical axis as indicated by a bundle of rays B. Therefore, the reflector 1 suffers from smaller aberrations than spheroidal reflectors, and hence the loss of luminous flux at the fly-eye-lens plates 3 and 4 and the light enhancer 5 is decreased.

It is seen from the foregoing that high utilization efficiency of available optical energy is achieved by the combined effects of increased luminous flux and decreased aberrations.

What is claimed is:

1. An image projection system comprising:
   a reflector for reflecting rays of light from a point source located at the focal point of said reflector;
   a matrix array of microscopic lenses arranged on a first plane and a matrix array of microscopic lenses arranged on a second plane, each lens of the first plane focusing light from said reflector onto a corresponding one of the lenses of the second plane;
   a plurality of optical elements arranged on a third plane for splitting light from said second plane into a first polarized component and a second polarized component parallel to the first, and converting the second polarized component to a polarization identical to the first polarized component;
   a focusing lens system for focusing light from the third plane onto a fourth plane;
   a display panel on said fourth plane for imagewise-modulating light focused thereon by said lens system; and a projecting lens system for projecting the imagewise-modulated light onto a screen, said reflector being configured so that any point on said reflector is defined by an equation containing a term of parabola and at least one term of a series of aspheric coefficients of order of even number which is equal to or greater than two.

2. An image projection system as claimed in claim 1, wherein said equation is defined as:

$$x = \frac{1}{R}y^2 \div \left(1 + \sqrt{1 - (K+1)y^2 \frac{1}{R^2}}\right) + \sum_{i=1}^{i=N} A_{2i} y^{2i}$$

where, x is a distance from a vertex of said reflector along the optical axis thereof, y is a distance from the optical axis on a plane normal thereto, R is a radius of curvature of the reflector, K is an aspheric constant and $A_{2i}$ is aspheric coefficient of order 2i, i and N are an integer equal to or greater than 1.

3. An image projection system as claimed in claim 1, wherein said equation is defined as:

$$x = \frac{1}{2R}y^2 + \sum_{i=1}^{i=N} A_{2i} y^{2i}$$

where, x is a distance from a vertex of said reflector along the optical axis thereof, y is a distance from the optical axis on a plane normal thereto, R is a radius of curvature of the reflector, $A_{2i}$ is an aspheric coefficient of order 2i, where i and N are an integer equal to or greater than 1.

* * * * *

UNITED STATES PATENT AND TRADEMARK OFFICE
CERTIFICATE OF CORRECTION

PATENT NO. : 6,302,544 B1
DATED : October 16, 2001
INVENTOR(S) : Tadashi Takeuchi It is certified that error appears in the above-identified patent and that said Letters Patent is hereby corrected as shown below:

<u>Title page,</u>
Item [30], the Foreign Application Priority Data, should read as follows:
-- March 12, 1999 --

Signed and Sealed this

Twenty-fifth Day of June, 2002

*Attest:*

*Attesting Officer*

JAMES E. ROGAN
*Director of the United States Patent and Trademark Office*